United States Patent Office

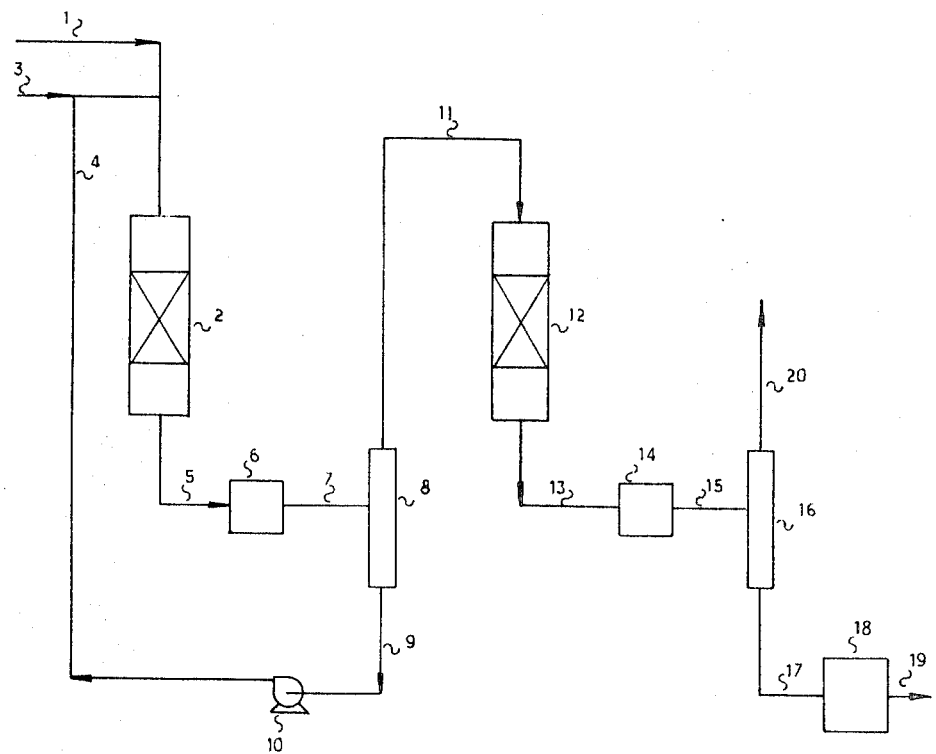

3,597,490
Patented Aug. 3, 1971

3,597,490
PROCESS FOR CONVERTING TOLUENE TO
BENZENE AND XYLENES
Seiya Otani, Takao Iwamura, and Shotaro Hayashi, Ohtsu-shi, and Daisuke Ogawa, Kyoto, Japan, assignors to Toyo Rayon Kabushiki Kaisha, Chuo-ku, Tokyo, Japan
Filed May 27, 1968, Ser. No. 732,376
Claims priority, application Japan, May 31, 1967, 42/34,227; Sept. 2, 1967, 42/56,117
Int. Cl. C07c *3/00, 3/58, 15/08*
U.S. Cl. 260—672                        1 Claim

ABSTRACT OF THE DISCLOSURE

In the conversion of toluene to benzene and xylenes by contacting toluene with a disproportionation catalyst at a temperature of from 300 to 650° C. under a pressure of from 1 to 100 atmospheres in the presence of hydrogen, an improvement which comprises contacting toluene with said catalyst in the presence of 0.5 to 50 mol percent based on the toluene of a $C_9$ aromatic hydrocarbon, e.g., recycle of trimethylbenzenes. Likewise, unwanted $C_8$ isomer m-xylene may be supplied along with the feed toluene.

---

Figure 3:
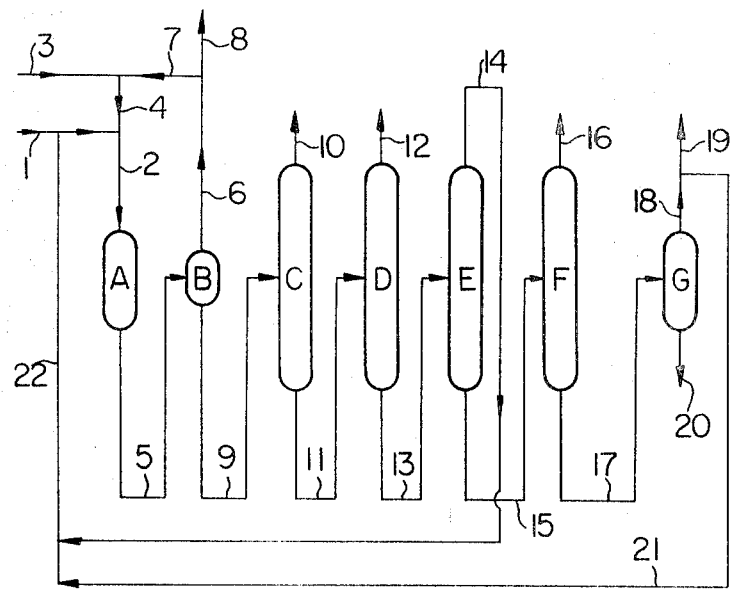

This invention relates to a process for converting toluene to benzene and xylenes, and more particularly to a process for converting toluene to benzene and xylenes with high selectivity.

Heretofore, a process for converting toluene to benzene and xylenes by subjecting toluene to disproportionation reaction has been known from, for instance, U.S. Pat. 2,795,629. This process is industrially esteemed because in this process toluene which is comparatively inferior in usefulness can be converted to benzene and xylenes which are of a greater importance as industrial chemicals.

The conventional process for disproportionating toluene to benzene and xylenes comprises contacting toluene in the gaseous phase at elevated temperatures and pressures with a disproportionation catalyst such as Friedel-Crafts type catalysts and solid acid catalysts. An improvement of the above process has also been known in which the reaction is carried out in an atmosphere of hydrogen in an amount extremely excessive based on the toluene whereby coke is prevented from being deposited on the catalyst and the catalyst life is prolonged.

However, in the conventional processes, the reaction products obtained under such reaction conditions contain, in addition to benzene, toluene and an isomeric mixture of xylenes, trimethylbenzenes which are formed as presumably resulting from disproportionation of the resulting xylenes therefore the conventional processes cannot avoid a disadvantage that the resulting useful xylenes are converted to trimethyl benzenes which are of an industrially lower utility. Although a considerable difference is observed between the conventional processes with respect to selectivity and other characteristics to the disproportionation reaction depending on the catalyst used, once a catalyst to be used is prescribed, it is practically difficult in the conventional processes to optionally change the yielding ratio of benzene and xylenes even by varying reaction conditions sharply, such as, varying reaction temperatures, reaction pressures and partial pressures of toluene. Still further, in the conventional processes there is a tendency that metaxylene which is of an industrially lower utility is yielded in a larger amount while other isomers of xylene which have a greater industrial merit, particularly paraxylene, are obtained only is small yields.

We have found that in the conversion of toluene to benzene and xylenes by a disproportionation reaction benzene and xylenes can be produced in high yields, particularly in high selectivity to xylenes with prevention of formation of trimethylbenzenes as a by-product, presumably resulting from the disproportionation of xylenes, by making a $C_9H_{12}$ aromatic hydrocarbon having one benzene ring present beforehand in the system. Further, it has been also found that in the conversion of toluene to benzene and xylenes the yield of useful ortho xylene can be increased by making a certain amount of meta- or paraxylene, particularly metaxylene present beforehand in the reaction system together with said $C_9H_{12}$ aromatic hydrocarbon.

The object of this invention is to provide a process for converting toluene to benzene and xylenes in high yields by disproportionation of toluene while inhibiting formation of trimethylbenzenes as byproduct.

Another object of this invention is to provide a process for the disproportionation of toluene whereby it is possible to increase the yield of paraxylene while inhibiting formation of metaxylene, namely isomerizing the resulting metaxylene to paraxylene and orthoxylene.

Still another object of this invention is to provide a process for the disproportionation of toluene which comprises a combination of a series of steps which can be industrially worked out.

The said objects can be achieved in accordance with a process of this invention which comprises contacting toluene with a disproportionation catalyst in the presence of 0.5–50 mol percent based on the toluene of a $C_9H_{12}$ aromatic hydrocarbon having one benzene ring.

As the disproportionation catalyst, any catalyst that has been known to possess an activity for disproportionating toluene can be used in the process of this invention. It is generally preferred to use a solid acid catalyst as such disproportionation catalyst. As the solid acid catalyst silica; alumina; silica-alumina; boria-alumina; and aluminosilicate such as hydrogenated zeolite, acid clay and activated clay are suitable. In this invention, in order to disproportionate toluene effectively in the gaseous phase it is preferred to use a solid acid catalyst such as silica-alumina, boria-alumina and aluminosilicate. The hydrogenated zeolite can be easily obtained by substituting metals contained in natural or synthesized zeolite by hydrogen.

In accordance with this invention, together with toluene there is fed a $C_9H_{12}$ aromatic hydrocarbon in an amount of 0.5–50 mol percent, preferably 1–10 mol percent based on the toluene and the toluene is contacted in the gaseous phase with said disproportionation catalyst in the presence of said $C_9H_{12}$ aromatic hydrocarbon. The $C_9H_{12}$ aromatic hydrocarbon may be a trimethylbenzene mixture which is formed as by-product in the disproportionation reaction of toluene. Such trimethylbenzene mixture formed as by-product generally contains small amounts of other $C_9H_{12}$ aromatics such as 1-methyl-3-ethylbenzene, 1-methyl-4-ethylbenzene, propylbenzene and $C_{10}$ or higher aromatics in addition to 1,2,3-trimethylbenzene, 1,2,4-trimethylbenzene and/or 1,3,5-trimethylbenzene. The main component of such mixture is 1,2,4-trimethylbenzene. In this invention, after separation of the $C_9H_{12}$ aromatic compounds contained in the reaction product, it is possible not only to recycle the separated $C_9H_{12}$ aromatic compounds to the reaction system but also to feed trimethylbenzene freshly from the outside together with toluene into the reacion system. In this invention the intended objects can be attained by using any of isomers of trimethylbenzene. It is preferred to feed trimethylbenzenes to the reaction system mixed with toluene, because a uniform distribution of trimethylbenzene can be achieved in the reaction system.

In the process of this invention for the disproportionation of toluene it is essential to make trimethylethylenes coexistent in the system. In case trimethylbenzenes are not present in the system, as mentioned above, the resulting xylenes are further disproportionated to form trimethylbenzenes, n-heptane and other by-products, with the consequence that yields of the intended benzene and xylenes are greatly lowered.

The content of trimethylbenzene is also a decisive factor for carrying out the reaction with ease and controlling the occurrence of said side reactions. Namely, adjustment of the selectivities to benzene and xylenes is achieved only by adjusting a ratio of trimethyl benzene to be added to the starting toluene, and no adjustment of other reaction conditions is required. In the process of this invention it is possible to change selectivities to benzene and xylenes within a broad range without lowering yields of benzene and xylenes by adjusting the ratio of trimethylbenzene to toluene regardless of other reaction conditions. Thus, in this invention it is possible to choose a desired selectivity with ease. In case the content of trimethylbenzene is smaller than 0.5 mol percent, the adjustment of selectivities to benzene and xylenes is difficult and it is also difficult to disperse trimethylbenzene uniformly in the reaction system, whereby the amount of the $C_9H_{12}$ aromatic compounds yields is increased by the disproportionation reaction of xylenes. Therefore, such a small content of trimethylbenzene is not preferred. In case the content of trimethylbenzene exceeds 50 mol percent, bad results such as lowering of the degree of disproportionation of toluene and extreme decrease of the ratio of conversion of toluene to benzene and xylenes are brought about.

Accordingly, in this invention it is essential to adjust an amount of trimethylbenzene within the range of from 0.5 to 50 mol percent based on the starting toluene. A preferred amount of trimethylbenzene is 1–10 mol percent based on the starting toluene. In the disproportionation reaction in accordance with this invention, the yield of benzene is increased by lowering the amount of trimethylbenzene within said specific range and the yield of xylenes in heightened by increasing the amount of trimethylbenzene within said range.

In conducting the process of this invention, it is preferred to make less than 20 mol percent, particularly from 1 to 20 mol percent of metaaxylene present beforehand in the reaction system together with said $C_9H_{12}$ aromatic compound based on the toluene. By making metaxylene present beforehand in the reaction system, it is possible to selectively produce paraxylene which is the most valuable from the industrial point of view among xylene isomers. In this case, it is preferred to feed metaxylene into the reaction system mixed beforehand with toluene together with said $C_9H_{12}$ aromatic hydrocarbon. As the metaxylene, the xylene fraction separated from the reaction product as it is or the fraction of metaxylene obtained by further distillation of said xylene fraction may be recycled into the reaction system. In the distillation paraxylene or orthoxylene is not completely separated and a minor portion thereof remains incorporated in the metaxylene. However, in such case metaxylene to be fed to the reaction system contains small amounts of orthoxylene, paraxylene and/or ethylbenzene.

In a preferred embodiment of this invention, by making metaxylene coexistent with trimethylbenzene in the reaction system it is possible to selectively perform the formation of benzene and xylenes and the isomerization of metaxylene to paraxylene while inhibiting the formation of trimethylbenzene as a by-product, presumably resulting from the disproportionation of xylenes. In case the mol ratio of metaxylene is above 20 mol percent, the ratio of conversion of toluene to benzene and xylenes is considerably lowered and the operation cost per the starting toluene is made higher. Therefore, it is generally inadvantageous to employ metaxylene in an amount of greater than 20 mol percent based on toluene.

For better understanding of this invention, reference may be made to the appended drawings.

Figure 4:
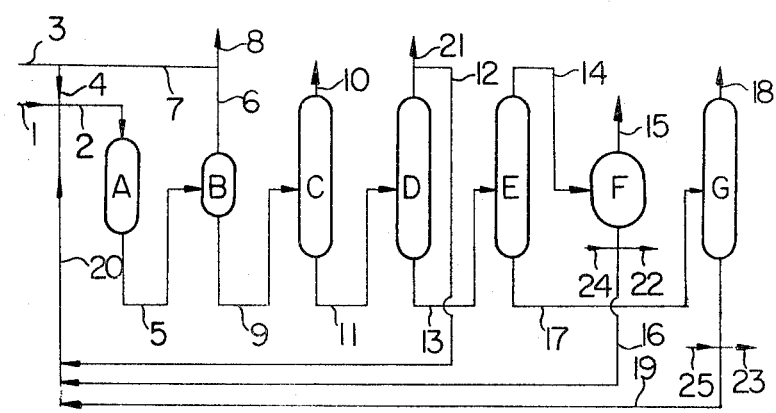
Figure 5:
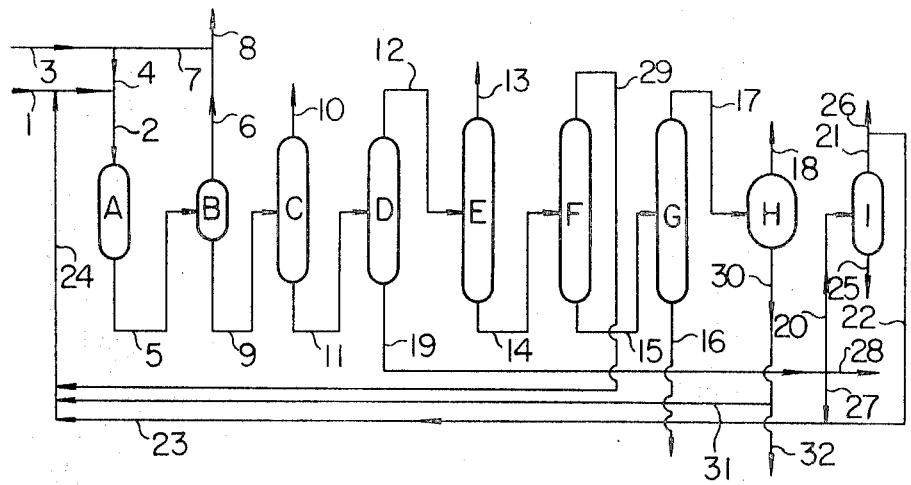
Figure 6:
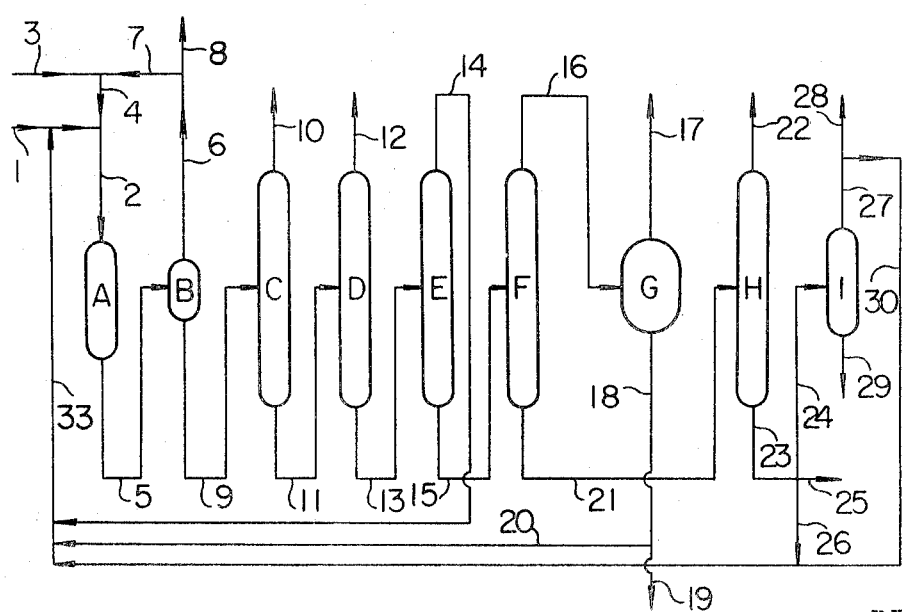

In the drawings, FIG. 1 is a graph showing the concentration, in the resulting reaction liquid, of trimethylbenzenes capable of formation with equilibrium at a temperature of 500° C. in correspondance to the mixing ratio of xylenes to toluene in the starting material; FIG. 2 is a graph showing the ratio of xylene and benzene capable of formation with equilibrium at a temperature of 500° C. in correspondance to the mixing ratio of xylenes to toluene in the starting material; FIG. 3 is a flow sheet illustrating one embodiment of the process of this invention; and FIGS. 4, 5 and 6 are flowsheets illustrating other embodiments of the process of this invention.

As is apparent from FIG. 1, when the mixing ratio of xylenes to toluene is 50 mol percent, theoretically, 9.5 mol percent of trimethylbenzenes may be yielded and, when expressed in terms of the ratio to toluene, 14.3 mol percent ($9.5 \times 150/100$) of trimethylbenzenes may be yielded. When the mixing ratio of xylenes to toluene is 100 mol percent, 13.2 mol percent of trimethyl benzenes may be yielded and, when expressed in terms of the ratio to toluene, 26.4 mol percent ($13.2 \times 200/100$) of trimethylbenzenes may be yielded. Further, when the mixing ratio of xylenes to toluene is 20 mol percent, 7.8 mol percent ($6.5 \times 120/100$) in terms of the ratio to toluene of trimethylbenzenes may be yielded. Therefore, in view of FIG. 1 it is evident that when the molar ratio of xylenes to toluene is increased, the amount of trimethylbenzenes formed as a by-product is also increased. Thus, in this invention the formation of trimethylbenzenes as a by-product can be inhibited by feeding beforehand in the reaction system 0.5–50 mol percent based on toluene, preferably 1–10 mol percent of trimethylbenzene according to the added amount of xylenes.

As is apparent from FIG. 2, when the ratio of xylenes to toluene contained in the starting material is 5 mol percent, the equilibrium ratio of xylenes to benzene contained in the product is 0.9, and when the ratio of xylenes to toluene is 20 mol percent, the equilibrium ratio of xylenes to benzene is 1.2. Thus, in this invention it is possible to vary the yielding ratio of xylenes to benzene according to use of the end product.

In FIGS. 1 and 2, $T_o$ and $X_o$ stand for the ratios of toluene and xylenes in the total starting materials, respectively, and B and X stand for the ratios of benzene and xylenes in the equilibrium composition, respectively.

The reaction conditions under which the process of this invention is carried out may be those adopted in the conventional gaseous-phase, catalytic disproportionation reaction. However, generally speaking, it is preferred to carry out the reaction at a temperature ranging from 300 to 650° C., particularly from 330 to 550° C. Further, in conducting the process of this invention, it is preferred to elevate the reaction temperature gradually as the reaction proceeds, since by such gradual elevation of the reaction temperature catalyst activity can be maintained at constant levels and hence, the constant conversion of toluene to benzene and xylenes can be maintained. More specifically, it is preferred that the reaction is carried out at a temperature of 330 to 480° C. for at least 10 hours but less than 150 hours after the initiation of the reaction and thereafter, the temperature is elevated by 1 to 100° C. over a period of 30 days. The reaction may be carried out under atmospheric or elevated pressures, but it is preferred to carry out the reaction under a pressure ranging from 1 to 100 atmospheres, particularly from 10 to 50 atmospheres.

In the reaction of this invention, since decomposition of the benzene nucleus is brought about to some extent, deposition of the carbon material on the catalyst is observed when the reaction is continued for a long time. Therefore, in such cases it is necessary to regenerate the catalyst by burning. In order to inhibit the deposition of the carbonaceous material on the catalyst, it is generally preferred to feed hydrogen in the reaction system and to carry out the reaction in the presence of hydrogen. A preferred amount of hydrogen to be fed ranges from 0.1 to 25 mols per mol of the total starting aromatic compounds, i.e., toluene, the $C_9H_{12}$ aromatic hydrocarbons and xylenes optionally contained. An amount of 5 to 15 mols per mol of the total starting aromatic compounds is particularly preferred. Hydrogen to be fed may be pure hydrogen or one containing impurities such as nitrogen and lower hydrocarbons, for instance, methane, ethane and propane. However, when hydrogen contains impurities, it is preferred that the concentration of hydrogen be about 60 mol percent.

Toluene is generally fed to the reaction system at a liquid hourly space velocity of 0.1 to 20 hr.$^{-1}$, and a preferred liquid hourly space velocity of toluene is in the range of from 0.5 to 4 hr.$^{-1}$. It is desired to feed toluene in the state eluted with hydrogen or a hydrogen-containing gas into the reaction system.

In the reaction of this invention, the reactor stored with the disproportionation catalyst may be of any type of fixed, moving and fluidized beds. Particularly preferred is a reactor of a fixed bed type.

The resulting reaction mixture is separated into a gaseous component containing hydrogen and optionally small amounts of lower hydrocarbons such as methane, ethane and propane, and a liquid component containing benzene, toluene, xylenes and the $C_9H_{12}$ aromatic hydrocarbons in accordance with the gas-liquid separation process known per se. The so obtained liquid component is subjected to distillation to separate out benzene, orthoxylene, a mixture of metaxylene and paraxylene and the distillation residue containing $C_9H_{12}$ and higher aromatic hydrocarbons such as trimethylbenzenes. The mixture of metaxylene and paraxylene is separated into metaxylene and paraxylene in accordance with the low temperature processing or extraction procedure known per se. The so obtained benzene, paraxylene and optionally orthoxylene are recovered, while toluene, trimethylbenzene and, if desired, metaxylene are recycled to the first step.

One suitable embodiment of this invention will be hereinafter explained by referring to the appended FIG. 3.

The reference $a$ is a reactor, the reference $b$ is a gas-liquid separator, the references $c$, $d$, $e$ and $f$ are rectification columns and the reference $g$ is a distillation column.

Fresh toluene is fed from passage (1) and mixed with the recycled toluene and trimethylbenzene at the previous described ratio, and the mixture is fed from passage 3 further mixed with hydrogen or a gas mainly comprising hydrogen and containing small amounts of lower hydrocarbons such as methane which has been recycled via passages 6 and 7. Then, the mixture is introduced into reactor $a$ in which a disproportionation catalyst is stored. The reactor effluent is introduced via passage 5 into gas-liquid separator $b$ where the mixture is separated at a temperature of from room temperature to 100° C. under a pressure of 1 to 100 atmospheres into a gaseous material containing hydrogen and small amounts of lower hydrocarbons such as methane, ethane and propane and a liquid material. The gaseous material is recycled via passages 6 and 7 to reactor $a$. A part of the gaseous material is released from passage 8 so as to maintain the hydrogen concentration at prescribed levels in the reaction system. The liquid product released from gas-liquid separator $b$ comprises toluene, xylenes and benzene as main components and further contains higher boiling point substances such as trimethylbenzenes and small amounts of low boiling point substances as by-products. An example of the composition of said liquid product is as follows:

|  | Percent by weight |
|---|---|
| Benzene | 5 to 25 |
| Toluene | 30 to 60 |
| m-Xylene | 10 to 20 |
| Ortho-xylene | 5 to 10 |
| Para-xylene | 5 to 0 |
| Ethylbenzene | 0.5 to 3 |
| Trimethylbenzenes | 5 to 30 |
| Low boiling point hydrocarbons | 0.1 to 0.4 |
| High boiling point residue | 0.2 to 5 |

The liquid product is introduced via passage 9 into rectification column $c$ where low boiling point hydrocarbons such as n-heptane are separated out and released from the column top via passage 10. Then, the liquid product is introduced via passage 11 into benzene-rectification column $d$ where benzene is separated out, and it is then recovered from the column top via passage 12. The remaining liquid component is thereafter introduced via passage 13 into toluene-rectification column $e$ where toluene is separated out, and it is then released from the column top. The so separated toluene is recycled to reactor $a$. The liquid remaining in the column bottom of toluene-rectification column $e$ is taken out and then introduced via passage 15 into xylene mixture-separating rectification column $f$ where a xylene mixture is separated out, and it is then recovered from the column top via passage 16. The bottom liquid from rectification column $f$ is introduced via passage 17 to trimethylbenzene-distillation column $g$ where the $C_9H_{12}$ aromatic compound fraction containing trimethylbenzenes is separated out, and it is then taken out from the column top This fraction is recycled via passages 18, 21 and 33 to reactor $a$. The liquid residue having a higher boiling point than that of the $C_9H_{12}$ aromatic compound fraction is exhausted from passage 20.

The running conditions of the gas-liquid separator, and rectification and distillation columns may be as follows:

|  | Temperature | Pressure |
|---|---|---|
| Gas-liquid separator | Room temp. to 100° C. | 1 to 100 atmospheres. |
| Low boiling point hydrocarbon-separating rectification column. | 30 to 150° C.[1] | Do. |
| Benzene-rectification column | 75 to 225° C.[1] | 1 to 20 atmospheres. |
| Toluene-rectification column | 100 to 265° C.[1] | Do. |
| Xylene mixture-rectification column. | 130 to 300° C.[1] | Do. |
| Trimethylbenzene-rectification column. | 160 to 300° C.[1] | 1 to 5 atmospheres. |

[1] At column top.

A packed column, a sieve-tray column, a bubble cap column, a plate column or the like may be optionally used as the rectification column.

Another preferable embodiment of this invention will be hereinafter illustrated by referring to the appended FIG. 4.

In FIG. 4, the reference $a$ is a reactor, the reference $b$ is a gas-liquid separator, the references $c$, $d$, $e$ and $g$ are rectification columns, and the reference $f$ shows a separator. Although each apparatus is drawn in a form of one block type for simplication's sake, it may be a combination of two or more stages.

Fresh toluene is fed from passage 1 and mixed with the recycled toluene, metaxylene and trimethylbenzenes at the above-mentioned specific ratio. The mixture is fed from passage 2 to reactor $a$ where a disproportionation catalyst is filled. The reaction mixture from reactor *a* is introduced via passage 5 into gas-liquid separator where the mixture is separated into a gaseous material and a liquid material. The gaseous mixture comprising hydrogen and lower hydrocarbons such as methane, ethane and propane is recycled to reactor *a* via passages 6 and 7, or via passage 2 together with a gas comprising mainly hydrogen which has been fed from passage 3. At this time, in order to maintain the hydrogen concentration at prescribed levels in the reaction system, a part of the gaseous material is released out of the system from passage 8.

The liquid product is introduced via passage 9 into benzene-and low boiling point hydrocarbon-rectification column *c* where the product is subjected to rectification at a column top temperature of 30 to 150° C. under a pressure of 1 to 20 atmospheres to separate out benzene and low boiling point hydrocarbons, which are released from passage 10. The remaining liquid portion is fed via passage 11 to toluene-rectification column *d* where toluene is separated out and released from the column top. The so separated toluene is recycled to reactor *a* via passage 12, 33 and 2. The remaining mixture is introduced via passage 13 into para- and metaxylenes-rectification column *e* where the mixture is subjected to distillation at a column top temperature of 150 to 270° C. under a pressure of 1 to 10 atmospheres to divide the mixture into a column top liquid containing a mixture of paraxylene and metaxylene and a column bottom liquid comprising a mixture of orthoxylene and trimethylbenzene. The former is introduced via passage 14 to separator *f* where it is subjected to low temperature processing at a temperature of −40 to −80° C. to separate out the solid of paraxylene and the remaining liquid portion rich in metaxylene. The so separated paraxylene is recovered via passage 15 and the remaining portion is recycled to reactor *a* via passages 16, 33 and 2. The mixture of orthoxylene and trimethylbenzenes separated in rectification column *e* is introduced via passage 17 into orthoxylenerectification column *g* where the mixture is distilled at a column top temperature of 140 to 270° C. under a pressure of 1 to 10 atmospheres to separate out orthoxylene and a liquid containing trimethylbenzenes. The so separated orthoxylene is exhausted from passage 18 and the liquid is recycled to reactor *a* via passages 19, 33 and 3. A part each of toluene, metaxylene and trimethylbenzenes may be removed from the system via passage 21, 22 or 23, if necessary for maintaining the mixing ratio within the prescribed range. When the occasion demands, metaxylene and trimethylbenzenes may be introduced from other process via passages 24 and 25, respectively.

There are many variations of the above-mentioned process. For instance, a one-staged rectification column may be provided between gas-liquid separator *b* and rectification column *c*, whereby low boiling point by-products can be separated from the column top. In this case, the column bottom liquid is introduced into rectification column *c*. According to this variation, it is possible to obtain benzene of high purity.

Further, the object of this invention can be attained with a great efficiency by introducing a part or the whole of the column bottom liquid from rectification column *g* into another trimethylbenzene-distillation column, separating out tar-like by-products therein and recycling the so obtained $C_9H_{12}$ aromatic hydrocarbons such as trimethylbenzenes to the reaction zone.

Still another embodiment of this invention will be hereinafter explained by referring to the appended FIG. 5, in which the reference *a* shows a reaction zone, the reference *b* is a gas-liquid separation zone, the references *c* to *g* shown are rectification zones, the reference *h* is a paraxylene-separation zone and the reference *i* is a distillation zone. Toluene mixed with trimethylbenzenes and metaxylene recycled via passage 33 at the aforedescribed specific ratio is fed via passages 1 and 2 to reaction zone *a*. A hydrogen-containing gas is introduced via passages 3, 4 and 2 into the reaction zone together with toluene. The reaction is carried out in the gaseous phase at a temperature of 300 to 650° C. under a pressure of 1 to 100 atmospheres. The reaction mixture is introduced into gas-liquid separation zone where the separation of the gas and the liquid is performed at a temperature of from room temperature to 100° C. under a pressure of 1 to 10 atmospheres. The gas comprising hydrogen and lower hydrocarbons such as methane, ethane and propane is recycled via passages 6 and 7 to the reaction zone together with a hydrogen-containing gas fed from passage 3. At this time a part of the separated gas is released out of the system via passage 8. The liquid mixture is introduced via passage 9 into lower hydrocarbon-rectification zone *c* where low boiling by-products such as butanes and pentanes are separated out at the column top at a column top temperature of 30 to 150° C. under a pressure of 1 to 100 atmospheres which are thereafter released to the outside via passage 10. The liquid remainder is fed from the column bottom to rectification zone *d* via passage 11. In rectification zone *d* the liquid is subjected to distillation at a temperature of 140 to 270° C. under a pressure of 1 to 10 atmospheres, whereby the liquid is separated into a column top liquid and a column bottom by-product mixture containing trimethylbenzenes. The by-product mixture is taken out from the column bottom and exhausted to the outside. The column top liquid is fed via passage 12 to benzene-rectification zone *e* maintained at a column top temperature of 75 to 225° C. and a pressure of 1 to 20 atmospheres. Then, benzene is recovered via passage 13. The remaining mixture is introduced via passage 14 into toluene-rectification zone *f* where toluene is separated out at a column top temperature of 100 to 265° C. under a pressure of 1 to 20 atmospheres. The so separated toluene is removed from the column top. The remaining mixture is introduced via passage 15 to paraxylene and metaxylene-rectification zone *g* where orthoxylene is separated out at a column top temperature or 140 to 270° C. under a pressure of 1 to 10 atmospheres, and the separated orthoxylene is taken out from the column bottom and exhausted via passage 16. A suitable amount of orthoxylene may be sometimes recycled to the reaction zone. The mixture remaining at the column top is fed via passage 17 to separation zone *h* where the mixture is subjected to low temperature processing and thereby divided into a portion rich in paraxylene and another portion rich in metaxylene. The paraxylene is recovered via passage 18. The high boiling point by-product mixture containing trimethylbenzenes taken out from rectification *d* is introduced via passages 19 and 20 to trimethylbenzene-distillation zone *i* where the mixture is separated at a column top temperature of 160 to 300° C. under a pressure of 1 to 5 atmospheres into a column top liquid comprising trimethylbenzene and a column bottom liquid comprising high boiling point by-products (which is then exhausted from passage 25). The trimethylbenzenes are recycled to the reaction zone via passage 21, 22, 23 and 33 together with toluene. At this time, a part of the trimethylbenzenes may be exhausted from passage 26. A part or the whole of the distillation residue liquor introduced from rectification zone *d* via passage 19 may be recycled to the reaction zone via passage 27 without being introduced into distillation zone *i*. Further, a part of the distillation residue liquid may be exhausted via passage 28.

The toluene exhausted from toluene-rectification zone *f* is recycled to the reaction zone via passage 29. The portion rich in metaxylene separated from separation zone *h* is recycled to the reaction zone via passages 30 and 31 together with toluene. A part of said portion may sometimes be exhausted from the system via passage 32.

Still another embodiment of this invention will be hereinafter explained by referring to the appended FIG. 6 where the reference *a* is a reactor, the reference *b* is a gas-iquid separator, the references *c* to *f* are rectification columns, the reference g is a separator, the reference h is a rectification column and the reference i is a distillation column.

Fresh toluene is fed from passage 1 and mixed with the recycled toluene, metaxylene and trimethylbenzenes. Then, the mixture is introduced into reactor a through passage 2. The reaction mixture from the reactor is introduced via passage 5 into gas-liquid separator b where the mixture is separated into a gaseous material and a liquid material. The gaseous material is passed through passages 6 and 7, and is recycled to the reactor a from passage 4 together with a gas comprising mainly hydrogen freshly fed from passage 2. At this time, in order to maintain the hydrogen concentration at constant levels, a part of the gaseous material is exhausted from the system via passage 8. The liquid product exhausted from the gas-liquid separator comprises mainly toluene, xylenes and benzene, and further containing high boiling components formed as by-products such as trimethylbenzenes and very small amounts of low boiling point components. The liquid product is introduced via passage 9 into low boiling point hydrocarbon-rectification column c where low boiling point components are separated out. Then they are exhausted out of the system via passage 10. The remaining portion is introduced via passage 11 into benzene-rectification column d where benzene is separated out, and it is recovered via passage 12. The remaining portion is fed via passage 13 to toluene-rectification column e where toluene is separated out. The toluene is recycled to the reactor via passages 14 and 33. The remaining mixture is fed via passage 15 to para- and orthoxylene-rectification column f where the mixture is divided into a mixture of paraxylene and metaxylene and a mixture of orthoxylene and trimethylbenzenes. The former mixture is fed via passage 16 to separator g where it is divided into paraxylene and metaxylene. The paraxylene is recovered from passage 17, and a part or the whole of the metaxylene is recycled to the reactor via passages 18, 20 and 33. In this case a part of the metaxylene may be taken out from the system via passage 19. The latter mixture of orthoxylene and trimethylbenzenes from rectification column f is introduced via passage 21 to orthoxylene-rectification column and a part or the whole of orthoxylene is taken out via passage 22. The remaining mixture comprising mainly trimethylbenzenes is released from passage 23, and a part or the whole of it is exhausted from the system via passage 25, or recycled to the reactor via passages 26, 31 and 33. The remainder is fed to trimethylbenzene-distillation column i where the high boiling point components contained in trimethylbenzenes are separated out. Then, they are exhausted from the system via passage 29. The remaining trimethylbenzenes are recycled to the reactor via passages 30, 31 and 33. A part of the trimethylbenzenes may be exhausted from the system via passage 28.

In accordance with the process of this invention, by making trimethylbenzene and, if desired, methaxylene beforehand in the reaction system it is possible to inhibit the formation of trimethylbenzenes as by-product, and further, by varying the ratio of trimethylbenzene to toluene contained in the starting material within the above-mentioned specific range it is possible to freely vary the yielding ratio of benzene and xylenes within a broad range without lowering the overall yield of these products. The above-mentioned are prominent effects of this invention. Still further, not only are yields of xylenes increased but also an advantage is attained that paraxylene which is the most valuable among xylenes can be produced in high yields. Thus, in accordance with this invention process is provided for converting toluene to benzene and xylenes, particularly paraxylene which are more industrially useful than toluene.

The following non-limitative examples are given for illustrating this invention more specifically.

EXAMPLE 1

Toluene containing trimethylbenzene was fed into a fixed bed type reactor of a 25 mm. inner diameter in which a catalyst comprising natural mordenite treated with hydrochloric acid was filled. The flow rate of the starting liquid, i.e., total aromatics to the catalyst was 150 g. cat. hr./g. mol. A hydrogen gas containing 25% of low hydrocarbons such as methane was fed to the reactor at a rate of 80 liter/hr. giving an 8:1 mol ratio of $H_2$/aromatics. The inside of the reactor was maintained at 410° C. under a pressure of 30 kg./cm.$^2$. Under such conditions the reaction was carried out by varying the mixing ratio of trimethylbenzene to toluene contained in the starting liquid. The results are shown in Table I below.

TABLE I

| Mixing ratio of trimethylbenzene to toluene in starting material (mol percent) | 0 | 0.3 | 0.7 | 4.5 | 21.6 | 46.0 | 70.0 | 100 |
|---|---|---|---|---|---|---|---|---|
| Content of benzene and xylenes in product liquid (mol percent) | 44.5 | 44.5 | 45.1 | 46.8 | 45.8 | 40.0 | 28.0 | 20.0 |
| Yielding ratio of xylenes to benzene (X mol/B mol) | 0.78 | 0.79 | 0.83 | 1.02 | 2.19 | 6.9 | 15 | 59 |
| Concentration of trimethylbenzens in product liquid (mol percent) | 3.1 | 3.4 | 3.6 | 4.3 | 9.6 | 19.1 | 27.8 | 36.9 |

As is seen from the results given in table above, by varying the mixing ratio of trimethylbenzene to toluene contained in the starting material within a range from 0.5 to 50 mol percent it is possible to vary broadly the yielding ration of xylenes to benzene without lowering the conversion ratio of toluene.

EXAMPLE 2

This example was performed in accordance with the embodiment shown in the appended FIG. 3.

A heat-insulating reactor of fixed bed type, in which a catalyst comprising natural mordenite treated with hydrochloric acid was filled, was used in this example. The reaction was carried out by recycling a hydrogen-containing gas after it had been separated out by a gas-liquid separator. Fresh toluene containing 9.3 mol percent of trimethylbenzene based on the toluene was fed to the reactor at a rate of 93 g./hr. based on the total aromatics. The toluene was mixed with the hydrogen-containing, recycling gas, heated at 420° C. by an electric heater and then introduced into the reactor. The reaction gas from the reactor was introduced into a condenser where the toluene phase was liquified, and the hydrogen-containing gas was separated out at 40° C. by the gas-liquid separator. The liquid phase was then introduced into a rectification column maintained at 225° C. and under a column bottom pressure of 10 kg./cm.$^2$ where low boiling point components were separated out, following which the remaining recation liquid was taken out from the system under atmospheric pressure. The reaction liquid was subjected to batch distillation to separate out benzene fraction, toluene fraction, xylene fraction and trimethylbenzene fraction in order. The boiling point range where each fraction was caught was as follows:

|  | ° C. |
|---|---|
| Benzene fraction | 79.8– 80.1 |
| Toluene fraction | 110.6–110.9 |
| Xylene fraction | 136.0–142.2 |
| Trimethylbenzene fraction | 157.9–168.4 |

Ratios of benzene fraction, toluene fraction, xylene fraction and trimethylbenzene fraction to the overall caught fractions were 17.8 mol percent, 51.6 mol percent, 25.0 mol percent and 5.6 mole percent, respectively.

In case a starting material having a trimethylbenzene concentration of 9.3 mol percent prepared by using the above toluene and trimethylbenzene fractions was fed to the reaction system, the same results were obtained. Accordingly, it is evident that no disadvantage by recycling and reusing toluene and trimethylbenzene.

EXAMPLE 3

The disproportionation reaction of toluene was conducted by employing the same reactor as in Example 1 and varying the kind of disproportionation catalyst. The concentration of trimethylbenzenes in toluene was 15.2 mol percent, the pressure inside the reactor was 30 kg./cm.$^2$ and the flow rate of the starting liquid to the catalyst was 200 g. cat. hr./g. mol. The molar flow ratio of hydrogen to the liquid was 8. As a most preferred reaction temperature is different according to the kind of the catalyst, the reatcion temperature was varied according to the kind of catalyst. The results are shown in Table II below.

TABLE II

| Catalyst | Silica-alumina | Alumina-AlF$_3$ | "Zeolon-H" | Natural mordenite treated with hydrochloric acid |
|---|---|---|---|---|
| Reaction temperature (° C.) | 530 | 510 | 410 | 400 |
| Xylene concentration in product liquor (mol percent) | 35.1 | 42.2 | 44.1 | 43.8 |
| Yielding ratio of xylenes to benzene (X mol/B mol) | 0.49 | 0.73 | 2.05 | 2.01 |
| Benzene to xylene ratio (in case only toluene was fed) | 0.27 | 0.40 | 0.78 | 0.79 |

As is apparent from the results given in Table II above, in accordance with this invention it is possible to vary selectivities to benzene and xylenes within a broad range in the disproportionation of toluene regardless of the kind of the catalyst to be used.

EXAMPLE 4

In this example the reaction was carried out by varying the composition of the starting material as shown in Table III below. The reaction conditions adopted were as follows:

Pressure: 30 kg./cm.$^2$
Temperature: 410° C.
Flow rate of aromatic feed to the catalyst: 150 g. cat. hr./g. mol
Molar flow ratio of hydrogen to the starting liquid: 8
Catalyst: Natural mordenite catalyst treated with hydrochloric acid.

The "disproportionation ratio of toluene" was calculated based on the formula $$\text{Disproportionation ratio of toluene} = \frac{\left(\begin{array}{c}\text{Toluene concentration at inlet} - \text{Toluene concentration at outlet}\end{array}\right)}{\text{Toluene concentration at inlet}}$$

The ratio of the C$_8$ aromatic isomers in the product excluding ethylbenzene exhibits almost the equilibrium composition. Namely, it is understood that the isomerization reaction proceeds concurrently with the disproportionation reaction. Further, the formation of ethylbenzene is greatly inhibited.

(1) In Experiments Nos. 1, 2, 3 and 4, the conversion ratio of toluene is lowered in proportion to the decrease of the toluene content of the starting material, and when the ratio of xylenes to toluene exceeds 20%, the disproportionation ratio of toluene is abruptly lowered. Therefore, it is necessary to adjust the mixing ratio of xylene to toluene below 20%.

(2) Under the conditions of this invention not only toluene but also xylenes are disproportionated; therefore, trimethylbenzenes are formed. The amount yielded of trimethylbenzenes are different according to the reaction conditions and the composition of the starting liquid. Generally speaking, as a higher conversion ratio of toluene is intended, an amount of trimethylbenzenes yielded is so increased, and such increase of an amount of trimethylbenzenes yielded is a great disadvantage. However, as is apparent from comparison of results of Experiments Nos. 5, 6, 7 and 8 with those of Experiments Nos. 1, 2, 3 and 4, such disadvantage is completely overcome by adding beforehand trimethylbenzene to the starting material in accordance with this invention.

EXAMPLE 5

The following Experiments A and B with regard to the disproportionation of toluene were performed by using a reactor filled with 200 g. of a catalyst comprising natural mordenite treated with hydrochloric acid, at a flow rate of toluene containing 6.3% of trimethylbenzene of 15 g./hr. at a hydrogen feed rate of 45 Nl./hr. and under a pressure of 30 kg./cm.$^2$.

Experiment A

The reaction was initiated at a temperature of 380° C., which temperature was elevated to 450° C. over a period of 15 hours. At 450° C. the reaction was continued for 135 hours. Thereafter, the temperature was raised to 500° C. at which the reaction was further continued until the total reaction time was 200 hours.

Experiment B

The reaction was initiated at 400° C., which temperature was elevated to 450° C. over a period of 15 hours. At 450° C. the reaction was continued for succeeding 85 hours. Thereafter, the temperature was raised to 500° C. at which the reaction was further continued until the total reaction time was 200 hours.

TABLE III

| | \multicolumn{16}{c}{Composition (mol percent)} | | | | | | | | | | | | | | | |
|---|---|---|---|---|---|---|---|---|---|---|---|---|---|---|---|---|
| Experiment No. | 1 | | 2 | | 3 | | 4 | | 5 | | 6 | | 7 | | 8 | |
| | Feed | Product | Feed | Product | Feed | Product | Feed | Product | Feed | Product | Feed | Product | Feed | Product | Feed | Product |
| Benzene | | 22.3 | | 19.5 | | 19.0 | | 15.1 | | 18.2 | | 18.9 | | 20.3 | | 14.8 |
| Toluene | 100 | 56.2 | 90 | 52.2 | 80 | 49.9 | 75 | 50.3 | 80 | 48.0 | 93.8 | 51.6 | 90 | 51.3 | 70 | 49.0 |
| Orthoxylene | | 4.2 | 0.8 | 5.5 | | 5.8 | 3.1 | 6.5 | | 6.6 | | 6.0 | | 5.5 | | 7.1 |
| Metaxylene | | 10.0 | 8.6 | 11.9 | 20 | 12.5 | 20.5 | 13.9 | 13.8 | 13.9 | | 12.5 | 3.8 | 11.9 | 23.8 | 14.0 |
| Paraxylene | | 4.0 | 0.6 | 5.3 | | 5.6 | 1.4 | 6.3 | | 6.3 | | 5.8 | | 5.4 | | 6.8 |
| Ethylbenzene | | 0.2 | | 0.2 | | 0.2 | | 0.2 | | 0.2 | | 0.2 | | 0.2 | | 0.2 |
| Trimethylbenzene | | 3.1 | | 5.4 | | 7.0 | | 7.7 | 6.2 | 6.8 | 6.2 | 5.0 | 6.2 | 5.4 | 6.2 | 8.1 |
| Disproportionation ratio of toluene | | 0.44 | | 0.42 | | 0.38 | | 0.33 | | 0.40 | | 0.45 | | 0.43 | | 0.30 |

The results of both experiments are shown in Table IV below.

TABLE IV

| Experiment | A | B |
|---|---|---|
| Lapse of time after initiation of reaction (hour) | 170-200 | 170-200 |
| Reaction temperature (° C.) | 500 | 500 |
| Conversion (mol percent) | 44 | 40 |
| Ring loss [1] (mol percent) | 0.9 | 0.9 |
| Reaction efficiency [2] | 49 | 44 |
| n-Hexane (p.p.m.) | 1 | 1 |
| i-Hexane (p.p.m.) | 2 | 2 |
| Ratio of n- and i-hexanes to benzene (p.p.m.) | 12 | 14 |

[1] The term "ring loss" identifies the decomposition ratio of the aromatic nucleus per cycle.
[2] The term "reaction efficiency" identifies the ratio of the conversion ring loss.

EXAMPLE 6

A long period experiment for the disproportionation of toluene using a catalyst comprising mordenite treated with hydrochloric acid was performed. The reaction conditions adopted were as follows:

Amount filled of the catalyst: 30 g.
Flow rate of toluene containing 6.3 mol percent of trimethylbenzene: 14 g./hr.
Feed rate of a mixed gas consisting of hydrogen and consisting of hydrogen and methane ($H_2$ concentration=85%): 41 Nl./hr.
Reaction pressure: 35 kg./cm.$^2$ In this experiment, in order to maintain the reaction efficiency at preferred levels, the elevation of the reaction temperature was examined. The results are shown in Table V below.

TABLE V

| Lapse of time (hr.) | 10 | 20 | 30 | 50 | 100 | 300 | 500 | 700 | 750 | 800 |
|---|---|---|---|---|---|---|---|---|---|---|
| Temperature (° C.) | 370 | 400 | 400 | 410 | 420 | 420 | 420 | 420 | 440 | 440 |
| Conversion (mol percent) | 27 | 37 | 43 | 43 | 42 | 41 | 39 | 38 | 43 | 42 |
| Ring loss (mol percent) | 0.5 | 0.8 | 1.0 | 1.1 | 0.9 | 0.7 | 0.7 | 0.9 | 1.2 | 1.3 |
| Reaction efficiency | 58 | 56 | 43 | 39 | 47 | 46 | 43 | 42 | 36 | 42 |

EXAMPLE 7

The disproportionation reaction of toluene was performed in accordance with the flow shown in FIG. 6.

The experiment was carried out by employing a heat-insulating reactor of a fixed bed type having an inner diameter of 28 mm. and being packed with 200 g. of a catalyst comprising natural mordenite treated with hydrochloric acid and by recycling a hydrogen-containing gas separated by the gas-liquid separation.

Toluene containing 9.3 mol percent of trimethylbenzene and 5.3 mol percent of metaxylene was freshly fed from the outside of the system at a rate of 101 g./hr. After it was mixed with a hydrogen-containing gas fed at a rate of 240 liters per hour, the mixed gas was heated at 430° C. by means of an electric heater and then introduced to reactor *a*. The gas exhausted from reactor *a* was cooled to 40° C. to liquify the toluene phase and the hydrogen-containing gas was separated at 40° C. by gas-liquid separator *b*. A part of the gaseous phase was purged from the system at a rate of 30 liters per hour, and the remaining portion of the gas was recycled to the reactor. By adjusting the rate of the purged gas to 30 liters per hour, the hydrogen concentration in the hydrogen-containing gas to be used in the next cycle is maintained at 98.4%. The reaction pressure was maintained at 30 kg./cm.$^2$ by feeding freshly hydrogen gas from the outside of the system. The liquid phase was fed to the rectification column *c* in which the column bottom pressure of 15 kg./cm.$^2$ and the column top temperature of 230° C. were maintained. In the rectification column *c*, low boiling point components were separated out from the column top and the reaction product was taken out from the column bottom under atmospheric pressure. The reaction product was then subjected to batch distillation under atmospheric pressure to obtain, benzene, toluene, xylenes and trimethylbenzenes, respectively. Rectification columns were maintained at the following temperatures:

|  | ° C. |
|---|---|
| Benzene-rectification column *d* | 79.8–80.1 |
| Toluene-rectification column *e* | 110.6–110.9 |
| Meta- and paraxylene-rectification column *f* | 136.5–139.5 |
| Orthoxylene-rectification column *h* | 139.5–142.2 |
| Trimethylbenzene rectification column *i* | 157.9–168.4 |

The meta- and paraxylene fraction was subjected to low temperature processing at −70° C. in separator *g*.

The composition of the reaction product was as follows:

|  | Mol percent |
|---|---|
| Benzene | 17.5 |
| Toluene | 50.4 |
| Orthoxylene | 6.3 |
| Metaxylene | 12.6 |
| Paraxylene | 5.9 |
| Ethylbenzene | 0.4 |
| Trimethylbenzenes | 6.9 |

The same results were obtained by preparing a toluene mixture having a trimethylbenzene concentration of 9.3 mol percent and a metaxylene concentration of 5.3 mol percent from the so separated toluene, metaxylene and trimethylbenzenes and feeding the mixture to the reactor *a*.

What we claim is:
1. A process for the conversion of toluene to benzene and xylenes which comprises the steps of contacting toluene, 0.5 to 50 mol percent based on the toluene of trimethylbenzene and less than 20 mol percent based on the toluene of metaxylene in a fixed bed-type reactor with a solid acid catalyst at a temperature of from 300 to 650° C. under a pressure of from 1 to 100 atmosphere in the presence of hydrogen in an amount of 0.1 to 25 moles per mol of the total amount of said starting aromatic compounds; subjecting the resulting mixture to distillation to separate benzene, toluene, orthoxylene, a mixture of metaxylene and paraxylene, and a distillation residue containing trimethylbenzenes respectively; subjecting the mixture of metaxylene and paraxylene to low temperature; processing to separate metaxylene and paraxylene; recycling the so separated toluene, metaxylene and trimethylbenzenes to the first step, and recovering the so obtained benzene, orthoxylene and paraxylene.

References Cited

UNITED STATES PATENTS

| 2,795,629 | 6/1957 | Boedeker | 260—668 |
| 3,211,798 | 10/1965 | Burk et al. | 260—668 |
| 3,221,072 | 11/1965 | Knox et al. | 260—672 |
| 3,377,400 | 4/1968 | Wise | 260—668 |
| 3,437,710 | 4/1969 | Pollitzer | 260—672 |

DELBERT E. GANTZ, Primary Examiner

G. E. SCHMITKINS, Assistant Examiner

U.S. Cl. X.R.

260—668A, 674A